United States Patent
Brown et al.

(10) Patent No.: US 6,615,989 B2
(45) Date of Patent: *Sep. 9, 2003

(54) METHOD OF ASSEMBLING AN IMPROVED BEAD-LOCK HIGH-PRESSURE FILTER UTILIZING A STAMPED METAL COVER, AND FILTER OBTAINED THEREBY

(75) Inventors: Gene W. Brown, Kearney, NE (US); Steven C. Julson, Quimper (FR)

(73) Assignee: Fleetguard, Inc., Cookeville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/433,220

(22) Filed: Nov. 4, 1999

(65) Prior Publication Data

US 2002/0148096 A1 Oct. 17, 2002

(Under 37 CFR 1.47)

Related U.S. Application Data

(62) Division of application No. 07/905,296, filed on Jun. 29, 1992, now abandoned, and a division of application No. 08/724,581, filed on Sep. 30, 1996, now Pat. No. 6,023,834.

(51) Int. Cl.$^7$ .................................................. B01D 27/08
(52) U.S. Cl. ................ 210/443; 210/450; 210/DIG. 17
(58) Field of Search ............................. 29/888.3, 451, 29/896.62, 902, 509, 510; 413/6, 4, 2, 5, 34, 31, 27, 26, 7; 220/619, 620; 210/443, 450, DIG. 17

(56) References Cited

U.S. PATENT DOCUMENTS

| 944,423 A | 12/1909 | Feix |
|---|---|---|
| 1,709,196 A | 4/1929 | Snyder |
| 1,890,193 A | 12/1932 | Punte |
| 2,584,551 A | 2/1952 | Chambers et al. |
| 2,586,508 A | 2/1952 | Brotman |
| 2,739,374 A | 3/1956 | Kaiser |
| 2,995,270 A | 8/1961 | Henchert |
| 3,142,280 A | 7/1964 | Heinle |
| 3,307,705 A | 3/1967 | Halmenschlager |
| 3,589,517 A | 6/1971 | Palmai |
| 3,791,021 A | 2/1974 | Bauman |
| 3,959,147 A | 5/1976 | Oakley et al. |
| 4,215,795 A | 8/1980 | Elser |
| 4,237,015 A | 12/1980 | Fearnhead |
| 4,369,113 A | 1/1983 | Stifelman |
| 4,507,203 A | 3/1985 | Johnston |
| 4,834,885 A | 5/1989 | Misgen et al. |
| 4,969,994 A | 11/1990 | Misgen et al. |
| 5,080,787 A | 1/1992 | Brown et al. |
| 5,490,930 A | * 2/1996 | Krull ............................. 29/509 |
| 6,023,834 A | * 2/2000 | Brown et al. ................. 29/509 |

* cited by examiner

Primary Examiner—Matthew O. Savage
(74) Attorney, Agent, or Firm—Nixon Peabody LLP; Tim L. Brackett, Jr.; Thomas W. Cole

(57) ABSTRACT

An improved, spin-on, bead-lock filter which is particularly adapted for use in a high-pressure oil filter in a diesel engine is provided. The filter includes a housing containing a filter medium and having an inwardly deformed periphery, and a cover assembly including a cover plate and a retainer plate having mutually spaced apart outer edges for forming a recess that receives the inwardly deformed portion of the housing. A gasket whose outer diameter is less than the inner diameter of the undeformed housing is seated in the recess. The smaller outer diameter of the gasket relative to the inner diameter of the housing allows the cover assembly to be easily positioned in place over the top of the housing during manufacture. Both a mechanical connection and a seal is formed between the cover assembly and the housing when the periphery of the housing is inwardly deformed pursuant to a bead rolling step in conformance with the assembly method of the invention.

13 Claims, 3 Drawing Sheets

METHOD OF ASSEMBLING AN IMPROVED BEAD-LOCK HIGH-PRESSURE FILTER UTILIZING A STAMPED METAL COVER, AND FILTER OBTAINED THEREBY

This application is a divisional of U.S. patent application Ser. No. 07/905,296 filed Jun. 29, 1992, now abandoned, and is a divisional of U.S. patent application Ser. No. 08/724,581 filed on Sep. 30, 1996, now U.S. Pat. No. 6,023,834.

TECHNICAL FIELD

The present invention relates to an improved, spin-on high-pressure fluid filter of the type having a bead-lock arrangement in lieu of a rolled lock seam to secure the cover to the housing, wherein the improvement comprises the use of a low-cost cover assembly formed from stamped metal plates, as well as a method of assembly thereof.

BACKGROUND OF THE INVENTION

Spin-on filters have been employed in a variety of applications including hydraulic systems and engine lubrication systems. Such filters generally include a filter element within a housing with a cover or nut plate secured at one end of the housing by which the filter can be screwed onto or off of a filter head. A central opening surrounded by a plurality of smaller openings is provided in the cover to direct flow through the filter element contained within the housing of the filter. In an inside/out flow arrangement, pressurized, unfiltered fluid (such as the lubricating oil used in a diesel engine) enters the central opening and exits through the surrounding openings after passing through the filter element within the housing. In an outside/in flow pattern, the pressurized, unfiltered fluid enters the surrounding openings and exits through the central opening after passing through the filter element. A circular gasket is provided on a top surface of the cover to serve as a seal between the filter and the filter head. A spring is provided at the lower end of the housing to push the filter element in sealing engagement with the underside of the nut plate that forms the cover.

Although satisfactory in low and medium applications, generally spin-on filters of the prior art have not been satisfactory for use in high-pressure applications such as in hydraulic transmission pumps, where surges of 1,000 psi or more can occur. Most spin-on filters currently available include covers constructed of a stamped steel disk, and a relatively thinner secondary disk spot welded thereto. The base disk includes an extruded, relatively shallow, internally threaded neck portion by which the filter can be connected to a filter head. Flow openings are punched into the base disk around the neck portion. The lip at the open end of the housing is connected, by means of a rolled lock seam, to the periphery of the secondary disk which is also formed to serve as a seat for the external gasket. In this design, fatigue failure is most likely to occur at the rolled lock seam or at the spot welds. A burst failure is most likely to occur either upon bending of the cover (which allows leakage to pass the external gasket) or upon unfolding of the rolled seam. Thus, prior art spin-on filters have been susceptible to failure at the cover and/or at the connection between the cover and housing. Welding of the housing and cover is often unacceptable due to the incompatibility of housing and cover materials such that a satisfactory weld cannot be formed.

To solve these problems, the applicants developed a novel high-strength, spin-on filter in which a reliable and durable seal between the cover and the open end of the housing was achieved without the use of either a rolled lock seam, or a weld by means of a bead-lock arrangement. This filter is described and claimed in U.S. Pat. No. 5,080,787, assigned to the Fleetguard, Inc., the entire specification of which is incorporated herein by reference. In this particular filter, a round cover formed from die-cast metal is provided which is circumscribed around its outer edge by both an upper, C-shaped groove and a lower groove having a rectangular cross section which seats an O-ring. The die-cast cover further includes a centrally located, threaded aperture which can be screwed onto the nipple of a filter head, and a plurality of oil outlet openings surrounding the threaded, centrally-located aperture. On the top surface of the die-cast cover, a circular groove is provided which circumscribes the outlet openings that surround the threaded aperture. This groove receives a gasket which creates a seal between the top surface of the cover of the filter and the filter head when the threaded aperture of the filter cover is screwed onto the threaded nipple of the filter head. In the method of assembling this prior art filter, the filter element is first placed into the interior of the housing. An O-ring is then seated around the second groove which circumscribes the lower part of the die-cast cover, and the cover is then inserted into the open end of the housing until the C-shaped groove which circumscribes the upper portion of the housing is positioned adjacent to the upper periphery of the housing. A roller is then used to inwardly deform the metal around the periphery of the housing in conformance with the C-shaped groove in the cover in what is known in the art as a "spin beading" operation. The spin-beading secures-the cover to the housing without the need for rolled lock seams which, as previously pointed out, are proven to rupture when exposed to high pressures. The use of a spin-beading operation to secure the cover to the housing, instead of a lock seam, allows this filter to be assembled rapidly and inexpensively.

While the filter disclosed and claimed in U.S. Pat. No. 5,080,787 represents a substantial advance in the art, the applicants have observed two areas where improvement would be desirable. First, while the die-cast cover used in this filter works well for its intended purpose, it is unfortunately expensive as compared to covers formed from one or more stamped metal plates. Secondly, because the seal between the cover and the housing is dependent upon the proper compression of the O-ring between the cover and the housing, the dimensional tolerances of the O-ring, and the depth of the groove in the cover that seals it are narrow. These narrow tolerances prevent the substitution of a less precisely dimensioned, but lower cost lathe-cut gasket for the O-ring. Thirdly, when the cover is inserted into the open end of the housing incident to the assembly operation, shear forces are applied to the O-ring that has been previously seated around the lower circumferential groove of the cover which are capable of either damaging the O-ring, or rolling it out of the lower circumferential groove of the cover, thereby destroying the cover seal. While the application of a lubricant to the seated O-ring prior to the insertion of the cover into the housing solves much of this problem, it also adds an unwanted step in the assembly operation.

Clearly, it would be desirable if an improved filter could be developed which maintained all of the structural and assembly advantages associated with the filter disclosed and claimed in the '787 patent, but whose cover could be replaced with a lower cost cover assembly formed from stamped metal plates and lathe-cut gaskets. It would further be desirable if the assembly of such an improved filter did not apply unwanted shear forces onto any of the sealing O-rings or gaskets during the assembly of the filter, and did not require the application of any O-ring or gasket lubricants.

SUMMARY OF THE INVENTION

It is an object of the present invention to provide a method of assembly an improved filter which maintains all of the advantages associated with the filter disclosed and claimed in U.S. Pat. No. 5,080,787, but which is less expensive and easier to manufacture.

It is a further object of the invention to provide such an improved filter which utilizes a relatively inexpensive cover assembly formed from stamped metal plates and lathe-cut gaskets, and which does not require the application of any lubrication to the sealing gaskets.

Finally, it is an object of the invention to provide an improved method of assembling a filter in which none of the O-rings or sealing gaskets is subjected to shear forces; during the assembly of the filter which could either damage or misalign the sealing gaskets.

To this end, the filter of the invention comprises a method of assembling a filter including housing having a periphery that includes an inwardly deformed portion, and a cover assembly including a cover plate and a retainer plate having mutually spaced apart outer edges for forming a recess that receives the inwardly deformed portion of the housing. A gasket is disposed in the recess defined by the mutually spaced apart outer edges for effecting a seal between the outer edge of the cover assembly and the inwardly deformed portion of the housing when said portion is inwardly deformed incident to a spin-beading operation.

In the preferred embodiment, both the cover plate means and the retainer plate are formed from a stamped metal, such as steel. Additionally, the retainer plate further includes a deformed portion located inside of its outer edge that defines a groove for receiving a second gasket for effecting a seal between the cover assembly, and a filter head. One of the walls of the deformed portion of the retainer plate may function to compress the first gasket when this gasket is engaged by the spin-beaded portion of the housing. Finally, the deformed portion of the retainer plate may have an exterior portion that acts as a spacer to uniformly space apart the outer edges of the cover plate and retainer plate.

The outer edges of the retainer plate may be dimensioned to extend over the periphery of the housing to limit the extent to which the cover assembly may be inserted into the housing during the assembly thereof. These outer edges may be deformed into frictional engagement with the inwardly deformed portion of the housing to prevent relative rotation between the cover assembly and the filter housing when the filter is screwed into a nipple of a filter head.

The invention encompasses a method of forming such a fluid filter which comprises the steps of providing a filter housing as previously described, placing a filter element within the housing, forming a cover assembly with first and second plates by interconnecting the two plates together so that they have mutually spaced apart outer edges that define a recess, seating a gasket in the recess, inserting the cover assembly into the open end of the housing such that the periphery of the filter housing is adjacent to the recess, and deforming at least some of the housing periphery inwardly into the recess to both secure and seal the cover assembly to the housing.

The method of the invention may further comprise the step of stamping a deformed portion in the first plate that is offset with respect to the outer edge of the first plate and using this offset portion to uniformly space apart the outer edges of the first and second plates to form the recess. In the preferred method of the invention, the deformed portion of the first plate defines a groove, and the method further includes the step of seating a second gasket in the groove which forms a seal between the filter and a filter head when the filter is secured onto the head.

The improved filter allows the cover assembly to be made of inexpensive stamped steel plates, and further allows the substitution of a less expensive lathe-cut gasket for the O-ring used in the prior art. The improved filter also obviates the need for applying potentially damaging shear forces to the gasket that seals the cover assembly to the housing, or lubricants to minimize the damaging effects of such forces, as the gasket does not engage the housing until the bead rolling step.

DETAILED DESCRIPTION OF THE PREFERRED EMBODIMENT

Figure 1:
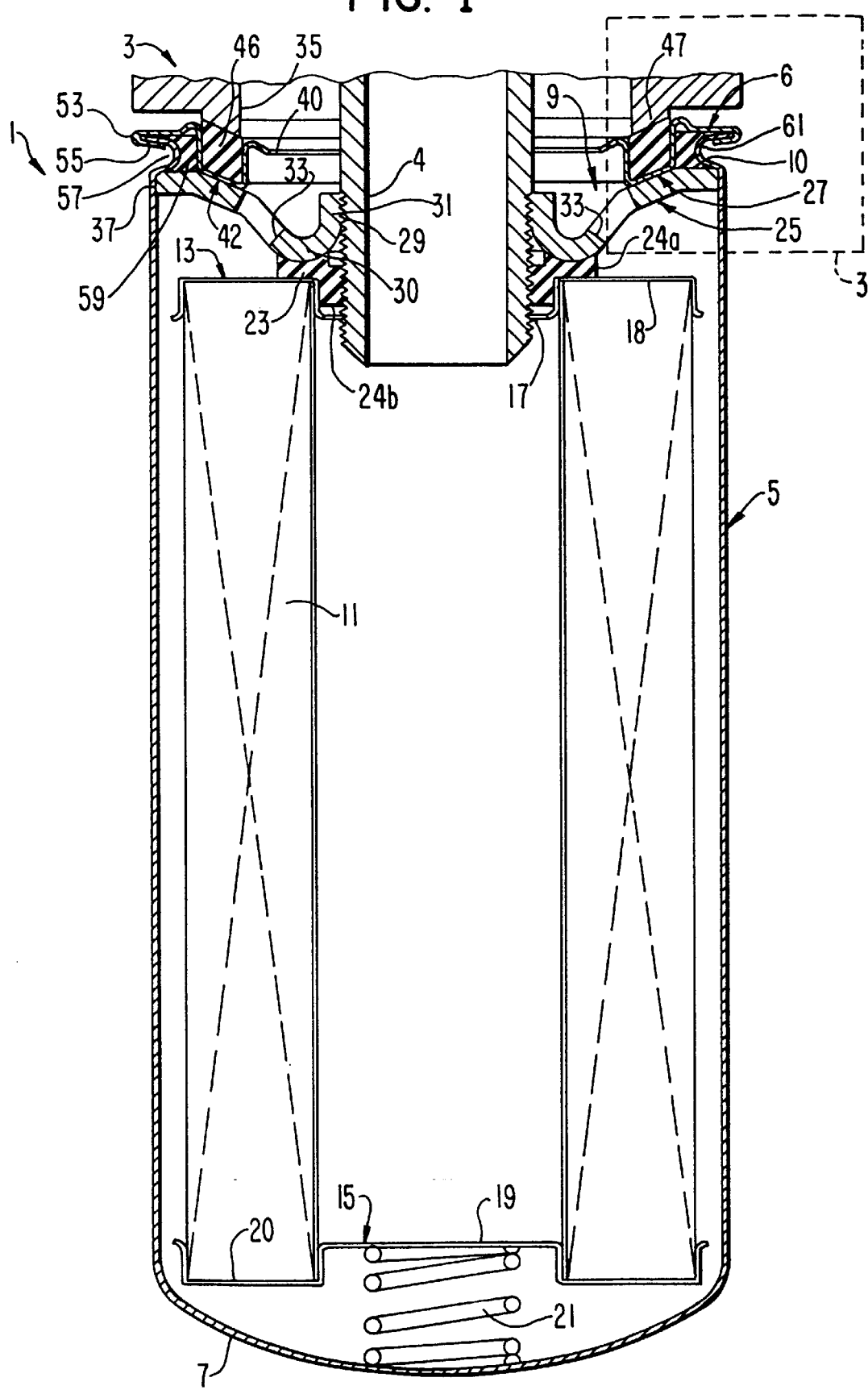
FIG. 1 is a cross-sectional side view of the improved filter of the invention as it would appear mounted on a filter head.
Figure 2:
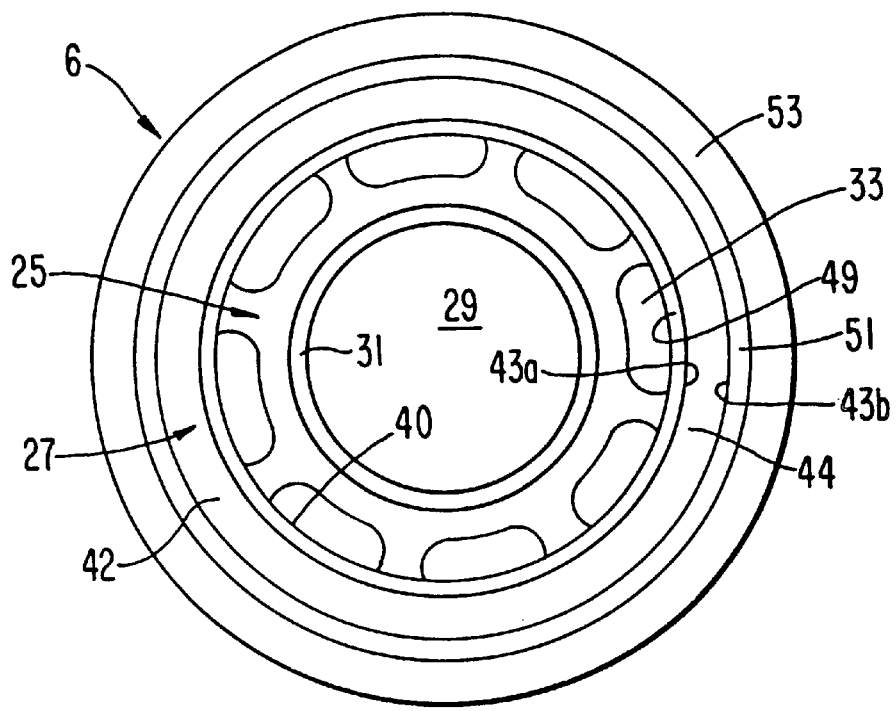
FIG. 2 is a plan view of the improved filter of the invention with the filter head gasket removed.

With reference now to FIGS. 1 and 2, the improved filter 1 of the invention is particularly adapted to be mounted in sealing engagement against a filter head 3 of the type typically used in the lubrication systems of diesel engines. Such a filter head 3 includes a centrally disposed threaded nipple 4 onto which the filter 1 is spun-on in sealing engagement.

The filter 1 itself generally comprises a cylindrical housing 5 formed from drawn steel, and a cover assembly 6. The housing 5 includes an integrally formed, closed bottom end 7, and a open top end 9 circumscribed by an upper peripheral portion 10. An annular filter element 11 is disposed in the interior of the housing 5. The filter element 11 is sealingly captured between top and bottom filter element retainers 13 and 15, respectively. The top filter element retainer 13 includes a centrally disposed aperture 17 for admitting the distal end of the threaded nipple 4 of the filter head, as well as an annular recess 18 which receives the upper end of the filter element 11. The bottom filter element retainer 15 includes a centrally disposed, circular wall 19 which is circumscribed by an annular recess 20 which in turn sealingly receives the bottom portion of the annular filter element 11. A spring 21 applies a compressive force between the closed bottom end 7 of the housing 5 and the circular wall 19 of the bottom filter element retainer 15 in order to bias the top filter element retainer 13 in sealing engagement against an annular seal 23. This seal 23 includes upper and lower flanges 24a, 24b for simultaneously sealing both the inner edge, and the inner top portion of the top filter element retainer 13 with respect to the outer diameter of the threaded nipple 4, and the cover assembly 6, respectively.

Figure 3:
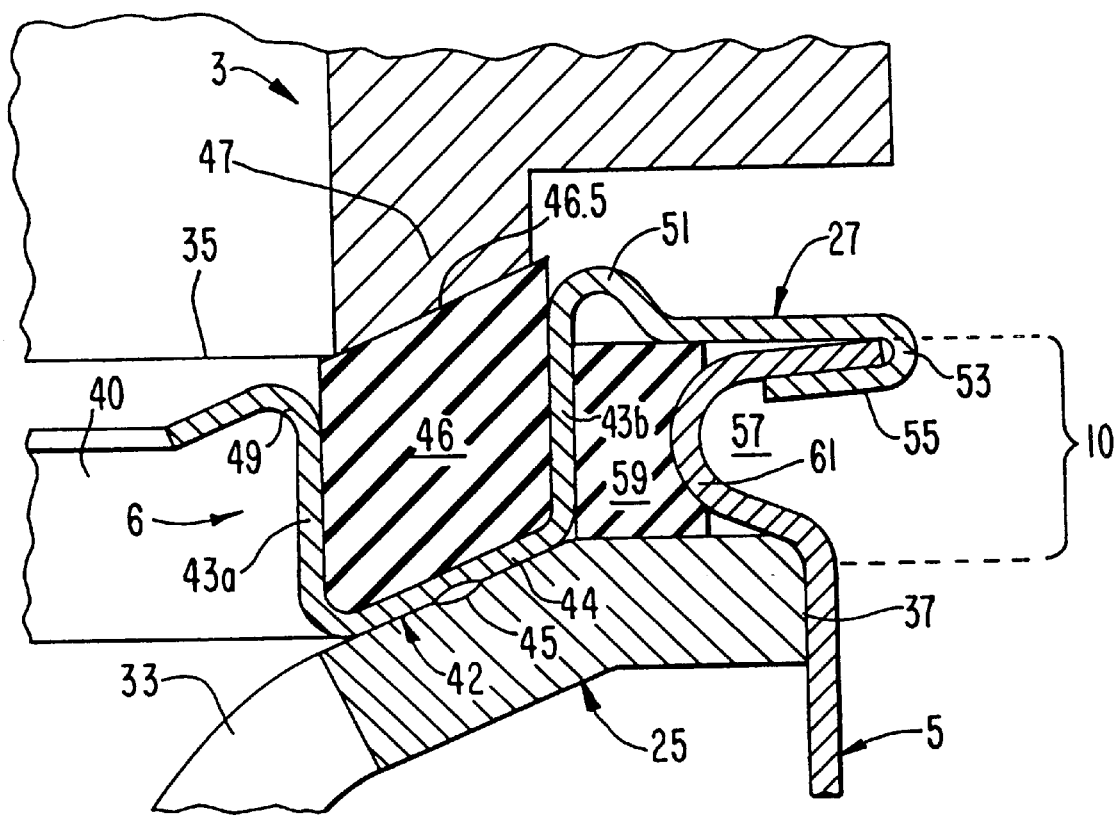
FIG. 3 is an enlarged view of the portion of FIG. 1 enclosed by a dashed square.

With reference now to FIGS. 2 and 3, the cover assembly 6 of the improved filter 1 generally comprises a relatively thick cover plate 25 (typically referred to as a "nut plate" in the art), in combination with an annular retainer plate 27. Both the cover plate 25 and retainer plate 27 are preferably formed from stamped steel. The cover plate 25 has a central opening 29 for the admission of pressurized, unfiltered fluid (such as unfiltered lubricating oil) from the threaded nipple 4 of the filter head 3. The central opening 29 is circumscribed by an annular bent portion 30 which terminates in a threaded flange 31 as shown. The screw threads on the flange 31 are, of course, compatible with the screw threads on the exterior of the threaded nipple 4. Circumscribing the threaded flange 31 are a plurality of peripheral openings 33 which act as flow outlets for admitting a flow of filtered fluid back up into an annularly-shaped flow inlet 35 of the filter head 3 that is concentrically disposed around the exterior of the nipple 4. The cover plate 25 terminates in an outer edge 37 whose diameter is slightly less than the inner diameter of the housing periphery 10.

The retainer plate 27 of the cover assembly 6 includes a centrally disposed, circular opening 40 which is slightly smaller than the diameter of the flow inlet 35 of the filter head 3. In its inner portion, the retainer plate 27 includes an annular deformed portion 42 having a U-shaped cross section as is most clearly seen in FIG. 3. This U-shaped deformed portion 42 includes inner and outer side walls 43*a*, 43*b*, respectively, as well as a bottom wall 44. The retainer plate 27 is affixed over the top surface of the cover plate 25 by a plurality of spot welds 45 between the bottom wall 44 of the U-shaped deformed portion 42, and the top surface of the cover plate 25. A filter head gasket 46 is seated within the U-shaped deformed portion 42. This gasket 46 has an upper, tapered sealing surface 46.5 which is complimentary in shape to a frustro-conical shoulder 47 which extends down from and circumscribes the-flow inlet 35 of the filter head 3. When the cover plate 25 of the cover assembly 6 is screwed onto the nipple 4 of the filter head 3 in the position illustrated in FIG. 1, the annular bent portion 30 of the cover plate 25 applies a compressive spring force against the bottom wall 44 of the U-shaped deformed portion 42 of the retainer plate 27 to squeeze the complimentary top surface 46.5 of the gasket 46 into seating engagement with the frustro-conical shoulder 47 of the filter head 3. To prevent the inner and outer side walls 43*a, b* from spreading in response to the compressive force applied to them by the filter head gasket 46, the retainer plate 27 is further provided with inner and outer bead-like shoulders 49 and 51 at the top of the inner and outer side walls 43*a*, 43*b*, respectively. These shoulders 49, 51 are preferably formed by stamping in order to work harden the upper portions of the side walls 43*a*,43*b*, thereby rendering them stronger.

In its outer portion, the retainer plate 27 terminates in an outer edge 53 which overhangs the outer edge 37 of the cover plate 25. This outer edge 53 is formed by inwardly bending a circular flange 55 that forms the outer edge of the retainer plate 27 prior to the assembly of the filter 1, as may be best understood with reference to FIG. 4. It is important to note that the outer diameter of the circular flange 55 of the retainer plate 27 is larger than the inner diameter of the upper peripheral portion 10 of the housing 5 such that the flange 55 limits the extent to which the cover assembly 6 may be inserted into the open top end 9 of the housing 5 during the assembly method.

The outer edges 37 and 53 of the cover plate and retainer plate, along with the outer side walls 43*b* of the U-shaped deformed portion 42, form a generally square recess 57 into which a gasket 59 having a generally rectangular cross section is seated. While virtually any gasket may be used in this application, gasket 59 is preferably of the inexpensive, lathe-cut variety in order to minimize the production expenses associated with the improved filter 1. As may best be seen with respect to FIG. 3, the gasket 59 is compressed against the outer side wall 43*b* of the U-shaped deformed portion 42 of the retainer plate 27 by a C-shaped, inwardly deformed portion of the housing periphery 10 in order to form an effective seal between the outer edge of the cover assembly 6, and the upper peripheral portion 10 of the housing 5.

In operation, the improved filter 1 is first mounted on the filter head 3 by screwing the threaded flange 31 over the threaded nipple 4 into the position shown in FIG. 1. Pressurized, unfiltered fluid flows through the threaded nipple 4 and into the center portion of the interior of the housing 5, where it is forced through the inner diameter of the annular filter element 11. The sealing engagement between the top and bottom portions of the filter element 11, and the bottom filter element retainer 15, top filter element retainer 13, and annular seal 23, does not allow the pressurized fluid flowing in from the nipple 4 to flow anywhere but through the filter element 11. Once the pressurized fluid has passed completely through the filter element 11, it flows through the annular space defined between the outer diameter of the filter element 11, and the inner diameter of the housing 5, where it collects and eventually flows through the flow outlets 33 defined in the cover plate 25. From the flow outlets 33, the filter fluid then flows into the annular flow inlet 35 of the filter head 3. The compressed, lathe-cut gasket 59 disposed between the cover assembly 6 and the upper peripheral portion 10 of the housing 5 prevents pressurized fluid from escaping through this inner face, while the filter head gasket 46 prevents filtered, pressurized fluid from flowing out between the inner face between the filter 1, and filter head 3.

Figure 4:
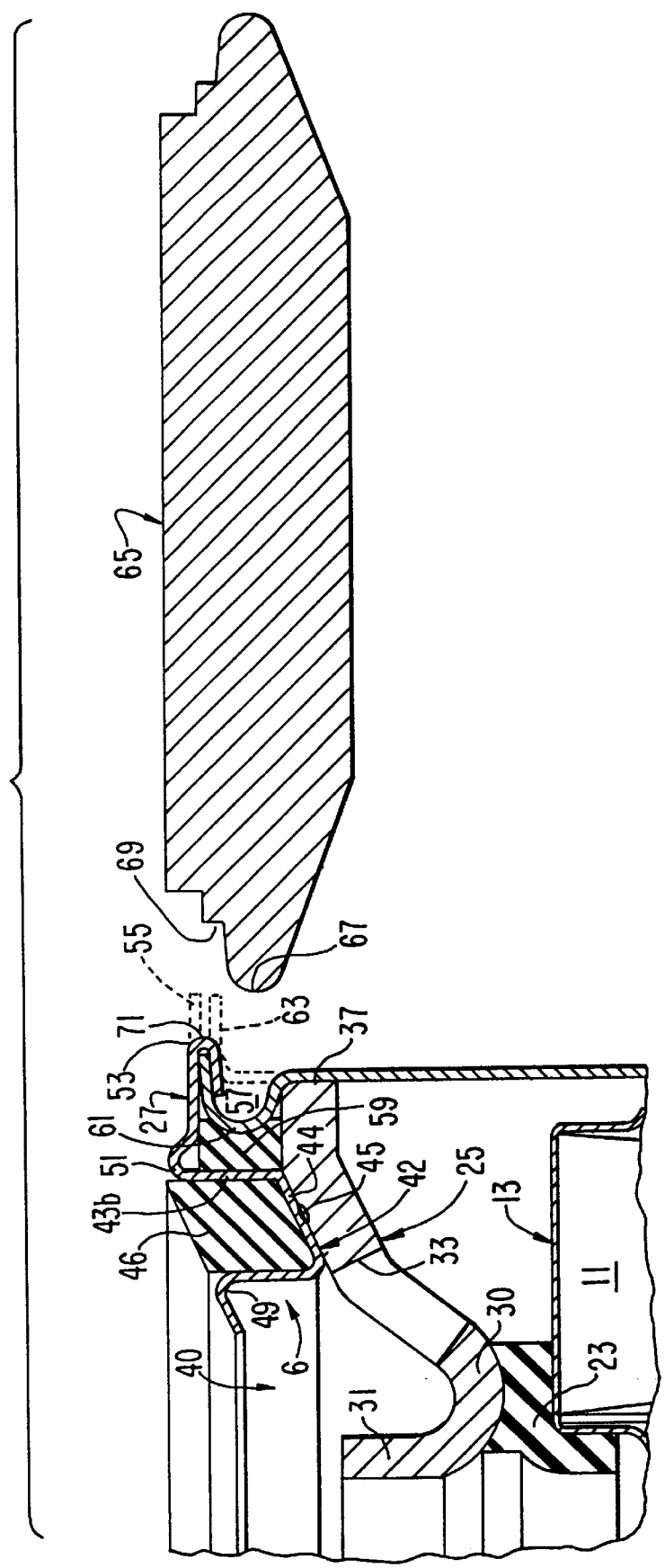
FIG. 4 is a cross-sectional side view of both the improved filter of the invention and the roller mechanism which inwardly deforms the upper peripheral portion of the filter housing to both secure and seal the cover assembly of the filter to the housing.

The method of assembly of the filter 1 may best be understood with respect to FIG. 4. Prior to assembly, the housing 5 is circumscribed by an orthogonally disposed, peripheral flange 63 (indicated in phantom). Similarly, the retainer plate 27 of the cover assembly is circumscribed by a circular flange 55 (again indicated in phantom) whose outer diameter is greater than the inner diameter of the upper peripheral portion 10 of the housing 5. As has been previously indicated, the outer diameter of the outer edge 37 of the cover plate 25 is slightly less than the inner diameter of the upper peripheral portion 10 of the housing 5. Prior to the insertion of the cover assembly 6 into the housing 5, the lathe-cut gasket 59 is seated in the recess 57 defined between the outer edges 37 and 53 of the cover plate 25 and retainer plate 27, respectively, and the outer side wall 43*b* of the U-shaped deformed portion 42 of the retainer plate 27. The outer diameter of the gasket 59 should be somewhat shorter than the outer diameter of the outer edge 37 of the cover plate 25. Such dimensioning of the outer edges of the cover plate 25, retainer plate 27, and gasket 59 allows the cover assembly to be easily inserted over the open top end 9 of the housing 5 into position illustrated in FIG. 4 until the circular flange 55 of the retainer plate 27 abuts the peripheral flange 63 of the housing in the positions shown in phantom. Advantageously, during the cover insertion step of this method, no sheer forces of any kind are applied to the gasket 59. As the cover assembly requires essentially no force to be inserted into the open top end 9 of the housing, the cover assembly is pushed down against the annular seal 23 with only enough force to overcome spring 21.

After the cover assembly 6 has been inserted into the upper peripheral portion 10 of the housing 5, a swaging roller 65 having a rounded edge 67 which terminates in a stepped portion 69 forcefully engages the upper peripheral portion 10 of the housing 5 to deform the peripheral flange 63 into the C-shaped deformed portion 61. The inner diameter of this deformed portion 61 compresses the gasket 59 such that a fluid tight seal is formed between the outer edge 37 of the cover plate 25, the outer side wall 43b of the U-shaped deformed portion 42 on the retainer plate 27, and the inner diameter of the C-shaped deformed portion 61 of the housing periphery 10. This same C-shaped deformed portion 61 also further serves to mechanically interconnect the cover assembly 6 with the housing 5 by forming an interference type joint between the housing 5, and the recess 57 defined between the outer edges of the cover plate 25 and retainer plate 27, which in turn maintains the inner bent portion 30 of the cover plate 25 in sealing engagement against the annular seal 23.

In the final step of the method of assembly, the circular flange 55 of the retainer plate 27 is folded around the top edge of the C-shaped deformed portion 61 of the housing periphery 10 into the position illustrated. Such a folding of the flange 55 accomplishes three purposes. First, it creates a smooth, rounded edge that covers the relatively sharp edge of the C-shaped deformed portion 61, thereby rendering the improved filter 1 safer to manually handle. Secondly, it increases the mechanical coupling between the cover assembly 6, and the housing 5. Thirdly, it provides a final sealing barrier between the cover assembly 6, and the housing 5, should the seal formed by the gasket 59 fail.

Industrial Applicability

The present invention provides a high strength filter capable of withstanding high pressures without failure occurring between the filter housing and a cover assembly formed from low cost, stamped steel plates. The structure of the cover assembly allows it to be inserted into the housing without the application of shear forces to the sealing gasket. The filter housing is joined to the cover utilizing a simple spin beading operation which deforms the housing into a recess defined in the sidewall of the cover by the spaced apart outer edges of the stamped steel cover plate and retainer plate that forms the cover assembly, without substantially stretching or thinning of the housing sidewall. A single spin beading step both seals and couples the cover assembly to the housing. While the present invention is particularly suitable for filtering liquids in which high hydrostatic and hydrodynamic forces are incurred, it should be apparent to one of ordinary skill that inventive features are also applicable to other fluid filter applications.

What is claimed is:

1. A fluid filter assembly for filtering a fluid, comprising:
    a housing having a longitudinal axis and a periphery that defines an open end, said periphery including at least one radially inwardly deformed portion adjacent the open end having a C-shaped portion that terminates in a flange, wherein said flange is a generally flat annular plate having an end that extends in a generally radial direction outwardly from said housing,
    a filter medium positioned via the open end within the housing,
    a cover assembly positioned in the open end of the housing comprising a cover plate and a retainer plate each having a mutually spaced apart outer peripheral edge in which the peripheral edges cooperate to form a recess receiving said radially inwardly deformed portion of said housing wherein the outer peripheral edge of the cover plate has a dimension less than an inner dimension of the periphery of the housing, and
    a gasket disposed in said recess defined by said mutually spaced apart outer peripheral edges for engaging and effecting a seal between the cover assembly and said inwardly deformed portion of the housing, said gasket having a peripheral edge dimension which is less than the dimension of the peripheral edge of the cover plate,
    wherein the gasket is in radial compression caused by the C-shaped portion of the radially inwardly deformed portion of the housing periphery.

2. The fluid filter as defined in claim 1, wherein both said cover plate and said retainer plate are formed from stamped metal.

3. The fluid filter as defined in claim 1, wherein both said retainer plate and said cover plate are metallic, and include deformed portions.

4. The fluid filter as defined in claim 1, wherein said retainer plate further includes a deformed portion located inside of its outer peripheral edge that defines a groove for receiving the gasket.

5. The fluid filter as defined in claim 4, wherein said deformed portion of the retainer plate includes a portion which spaces the outer peripheral edge of the cover plate from the outer peripheral edge of the retainer plate.

6. The fluid filter as defined in claim 4, wherein said deformed portion of said retainer plate has a bottom portion that is secured to the cover plate by a weld joint.

7. The fluid filter as defined in claim 1, wherein said cover plate further includes a deformed portion located inside of its outer peripheral edge that defines a groove for receiving a second gasket for effecting a seal between said filter device and said cover assembly.

8. The fluid filter as defined in claim 1, wherein a portion of the cover assembly prevents relative rotation between said cover assembly and said housing.

9. The fluid filter as defined in claim 8, wherein said portion that prevents relative rotation includes at least a portion of the outer peripheral edge of the retainer plate that fictionally engages the radially inwardly deformed portion of said housing.

10. The fluid filter as defined in claim 9, wherein said outer peripheral edge of the retainer plate is folded over said end of said flange that terminates said C-shaped portion in fluid sealing engagement.

11. The fluid filter as defined in claim 1, wherein the outer peripheral edge of said retainer plate extends over the periphery of the housing to limit the extent to which the cover assembly is longitudinally inserted into the housing and to align said recess with said radially inwardly deformed portion of said housing.

12. The fluid filter as defined in claim 1, wherein said C-shaped portion of said radially inwardly deformed portion of said housing is free of substantial thinning.

13. The fluid filter as defined in claim 1, wherein said retainer plate means and said cover plate means are formed from stamped steel, and said housing is formed of drawn steel.

* * * * *